United States Patent
Huang et al.

(10) Patent No.: US 9,875,165 B2
(45) Date of Patent: Jan. 23, 2018

(54) COMMUNICATION BUS WITH BASEBOARD MANAGEMENT CONTROLLER

(71) Applicant: Quanta Computer Inc., Taoyuan (TW)

(72) Inventors: Chih-Chia Huang, Taoyuan (TW);
Hao-Yu Chan, Taoyuan (TW);
Te-Hsien Lai, Taoyuan (TW); Tsai-I Yen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/950,519

(22) Filed: Nov. 24, 2015

(65) Prior Publication Data
US 2017/0147453 A1  May 25, 2017

(51) Int. Cl.
G06F 11/00 (2006.01)
G06F 11/20 (2006.01)

(52) U.S. Cl.
CPC .... G06F 11/2007 (2013.01); *G06F 2201/805* (2013.01); *G06F 2201/85* (2013.01)

(58) Field of Classification Search
USPC .......................................................... 714/4.2
See application file for complete search history.

(56) References Cited

U.S. PATENT DOCUMENTS

| 6,862,642 B1* | 3/2005 | Packer ................ G06F 11/0745 326/9 |
| 2002/0108076 A1* | 8/2002 | Barenys .............. G06F 11/221 714/43 |
| 2007/0088988 A1 | 4/2007 | Gupta et al. |
| 2007/0240019 A1 | 10/2007 | Brady et al. |
| 2012/0084596 A1* | 4/2012 | Chen .................. G06F 11/0745 714/2 |

FOREIGN PATENT DOCUMENTS

| CN | 1991783 A | 7/2007 |
| CN | 102571478 A | 7/2012 |
| TW | 201220076 A | 5/2012 |

OTHER PUBLICATIONS

Taiwanese Office Action for Application No. 105104667, dated Mar. 3, 2017, w/ First Office Action Summary.
Taiwanese Search Report for Application No. 105104667, dated Mar. 3, 2017.

* cited by examiner

*Primary Examiner* — Sarai Butler
(74) *Attorney, Agent, or Firm* — Nixon Peabody LLP; Eduardo J. Quinones; Zhou Lu

(57) ABSTRACT

A system and method of using a baseboard management controller (BMC) to detect a fault on a communication bus. The BMC is connected to and monitors the operation of the communication bus. The BMC automatically detects a communication bus hang and reports bus hang to the host. The BMC attempts to access the communication bus. If the BMC can access the communication bus, the BMC then resets all of the devices connected to the communication bus. The BMC then attempts to contact components connected to the devices. If a component is not accessible via its communication device, the BMC blocks the channel used by the component and reports that information. Once the BMC detects that the component has been removed, the BMC attempts to recover the channel via the I2C/SM bus for use by the computer network.

14 Claims, 2 Drawing Sheets

COMMUNICATION BUS WITH BASEBOARD MANAGEMENT CONTROLLER

TECHNICAL FIELD

Embodiments of the system and method are generally related to a communication bus. More specifically, embodiments of the system and method generally relate to a communication bus with baseboard management controller fault detection.

BACKGROUND

A communication bus, such as but not limited to an inter-integrated circuit (I2C) bus, in a computer network connects a host to other I2C devices and components. The I2C bus can be used for communication between the host and internal as well as and external I2C devices of the computer network. Unfortunately, some I2C devices on the I2C bus can cause communication over the I2C bus to stop, or "hang" for a variety of reasons. If communication over the I2C bus hangs, then the computer system may not operate properly, if at all. In order to remove the I2C bus hang, the computer network must be manually restarted and an attempt must be made to discover which I2C device caused the bus hang. This is both undesirable and cumbersome.

SUMMARY

According to an embodiment of the invention a BMC is connected to and monitors the operation of the I2C bus of a computer network. The BMC automatically detects a bus hang on the I2C bus and may reset all of the I2C bus devices. The BMC identifies an I2C bus device that does not reset and block communication with that I2C device. The BMC resets all the I2C devices again after blocking communication with the I2C device that caused the bus hang. The BMC reconnects the I2C bus and the remaining I2C devices and resume detecting bus hangs on the I2C bus.

The above embodiment may have various features. The BMC may detect an I2C bus hang and determine if the BMC can access the I2C bus switch. The BMC may detect an I2C bus hang and reset all of the I2C devices on the I2C bus.

The BMC may determine if the BMC can access the I2C bush switch directly and may report that I2C bus switch is not the cause of the bus hang. The BMC may determine if the BMC can access the I2C bus devices using the I2C bus.

The BMC may determine the I2C bus device causing the bus hang and may report the I2C bus device to a host. The BMC may reset all I2C devices again and identify any I2C devices causing a bus hang.

The BMC may identify a component connected to an I2C bus device that is causing a bus hang and poll all components connected to the I2C bus device. The BMC may block the channel of an I2C bus device that is used by a component that does not respond to polling from the BMC.

The BMC may report the component causing the blocking and may report the channel used by the component to a host. The BMC may remove inform a host to remove the component causing the blocking and detect the removal of the component from the I2C device.

The BMC may recover the channel used by the component causing the blocking after detecting the removal of the component from the I2C device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Embodiments of this disclosure provide a system and method of using a baseboard management controller (BMC) to detect a fault on a communication bus, such as but not limited to, an I2C bus. The BMC is connected to and monitors the operation of the I2C bus of a computer network. The BMC automatically detects an I2C bus hang and reports the bus hang to the host. The BMC attempts to access the I2C bus switch. If the BMC can access the I2C bus switch, the BMC resets all of the devices connected to the I2C bus. The BMC next attempts to contact components connected to the I2C devices via the I2C bus. If a component is not accessible via its I2C device, the BMC isolates or blocks the channel used by the component, reports the channel isolation, and the network can resume operation. The BMC also reports that the component can be removed from the computer network. Once the BMC detects that the component has been removed, the BMC attempts to recover the blocked channel via the I2C device and reports the recovered channel is now available for another component to be added to the network.

Figure 1:
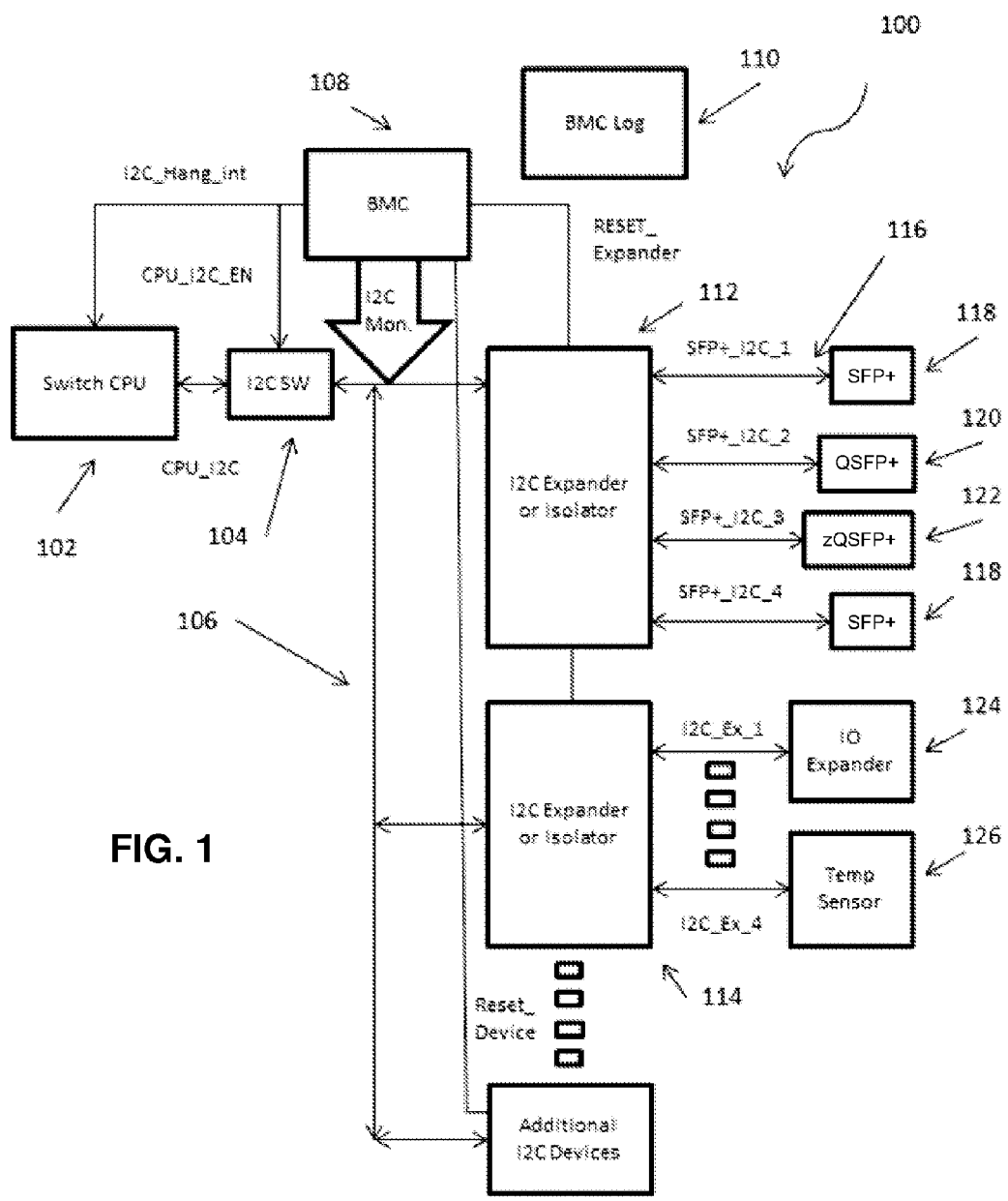
FIG. 1 is an exemplary diagram of an embodiment of the disclosure, in which a portion of a computer network is shown including a network switch, baseboard management controller (BMC) with a fault detector, an I2C switch and bus, I2C expanders and isolators, and I2C devices.

FIG. 1 is an exemplary view of a communication bus with a BMC fault detector according to an embodiment of the present invention in which a computer network 100 includes a host, such as the network switch 102. The network switch 102 is connected to the I2C bus 106. The baseboard management controller (BMC) 108 with fault detection is connected to and monitors the I2C bus 106. A plurality of I2C devices 112, 114 are also connected to the I2C bus 106. The I2C devices 112, 114 can be of a variety of types, such as but not limited to I2C expanders or I2C isolators. A plurality of components 118-126 are in communication with the I2C bus 106 via the I2C devices 112, 114.

The BMC 108 monitors the I2C bus 106 for a bus hang. When the BMC 108 detects a bus hang, the BMC 108 attempts to access the I2C switch 104. The BMC 108 then records the bus hang data in a data log 110.

If the BMC 108 still detects a bus hang after isolating the I2C switch 104, the BMC 108 resets all of the I2C devices on the I2C bus 106. The BMC 108 then determines if all of the I2C devices 112, 114 on the I2C bus 106 reset successfully. If all of the I2C devices 112, 114 reset successfully, then the BMC 108 determines that the I2C devices 112, 114 are not the cause of the bus hang. The BMC 108 records the bus hang data in a data log 110.

If the BMC 108 detects that at least one of the components 118-126 connected to the I2C devices 112, 114 on the I2C bus 106 did not reset successfully, then the cause of the bus hang is at least one of those components 118-126. The BMC 108 then tests each component 118-126 by sending a signal to each via their respective I2C devices 112, 114 as the BMC is not able to access the components 118-126 directly, at least in this embodiment.

After the BMC 108 sends a signal to each of the components 118-126, the BMC 108 awaits a response from each of the components 118-126. For example, the BMC 108 can send a signal via the I2C bus 106 through the I2C expander 112 to a variety of components, including transceivers such as the small form-factor pluggable transceiver (SFP+) 118, the quad small form-factor transceiver (QSFP+) 120, and the z-quad small form factor transceiver (z-QSFP+) 122. In another example, the BMC 108 can send a signal via the I2C bus 106 through the I2C expander 114 to a variety of components, such as the 10 expander 124 and the temperature sensor 126.

The BMC 108 determines which of the components 118-126 does not respond to the signal sent by the BMC 108 through their respective I2C devices 112, 114 after waiting a predetermined time period. The BMC 108 then isolates the channel(s) 116 used by the components 118-126 that did not respond to the signal sent by the BMC 108 within the predetermined time period. The BMC 108 records the bus hang data in the data log 110. By isolating the channel(s) 116 used by the components 118-126 that are causing a bus hang, the BMC 108 allows the computer network 100 to operate without requiring a manual reset and prevents the bus hang from impacting the computer network 100.

The BMC 108 can indicate that the components 118-126 detected by the BMC 108 are the source(s) of the bus hang and should be removed, such as but not limited to a text message displayed on a screen, a visual indicator, such as an LED, an audio signal, or other methods known to those of skill in the art.

The BMC 108 can monitor and detect, via the I2C bus 106, whether the components 118-126 causing the bus hang have been removed from the computer network 100. Once the component(s) 118-126 that caused the bus hang have been removed, the BMC 108 can recover the channel(s) 116 previously used by the components 118-126, and can record the bus hang data in the data log 110. The BMC 108 can also inform the host via an indicator and/or message that the previously isolated channel(s) 116 are available for a new component(s) to be connected.

Figure 2:
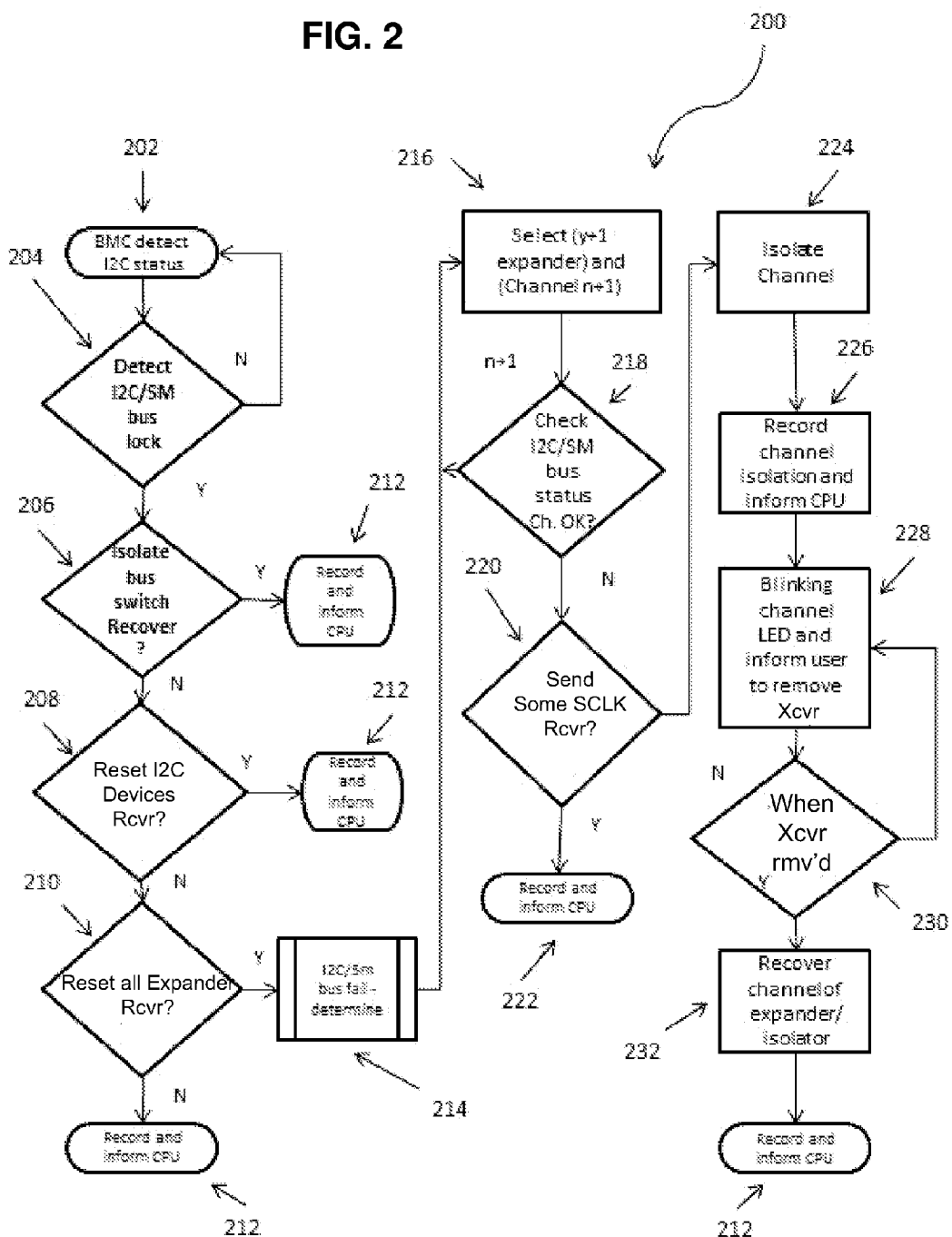
FIG. 2 is an exemplary flowchart of an embodiment of the disclosure, providing the steps of monitoring and detecting a fault on an I2C bus using a BMC.

FIG. 2 is an exemplary flowchart of a BMC with a fault detector monitoring a communication bus (such as but not limited to an I2C bus) according to an embodiment of the present invention. The flowchart 200 includes a variety of steps that detail the detection of a fault by the BMC on the I2C bus and a variety of corrective actions taken by the BMC.

In the first step 202, the BMC connected to the I2C bus detects the status of the I2C bus. In step 204, the BMC detects a bus hang on the I2C bus. The BMC then attempts to access the I2C devices on the I2C bus in step 206. If the BMC cannot access the I2C devices over the I2C bus, the BMC reports that the bus hang has occurred on the I2C bus in step 212.

In step 208, the BMC attempts to reset all of the I2C devices connected to the I2C bus. If the BMC can reset all of the I2C devices successfully, the BMC reports that information to the host in step 212. If any I2C device is not accessed successfully, the process moves to step 210.

In step 210, the BMC resets all of the I2C expanders. If the I2C bus is still hanging after resetting, the BMC determines that the bus hang is in a component connected to the I2C expander in step 214. If the I2C bus is not hanging after resetting, the BMC reports to the host in step 212. In step 218, the BMC checks the status of the I2C/SM bus.

If the BMC does not detect a bus hang on selected I2C device, the BMC polls each of the components connected to the I2C expander via the I2C/SM bus. The BMC then waits for a response from each of the components. In step 222, the BMC reports to the host if each of the components connected the I2C/SM bus respond to polling by the BMC.

If the BMC does not receive a response from at least one of the expander components via the I2C/SM bus, then at step 224 BMC blocks the communication channel used by the component. In step 226, the BMC reports that at least one expander component did not respond to the polling sent by the BMC and that the BMC has blocked the channel(s) used by the non-responsive expander component. That channel(s) will remain blocked as long as the unresponsive expander component remains connected, to avoid future bus hangs and allow the computer network to operate.

In step 228, the BMC reports that the bus hang component has been determined, using an indicator such as an LED, and further reports that the determined expander component is the cause of the bus hang and should be removed from the computer network.

The BMC continues to monitor the I2C bus, I2C devices, and the expander components connected to the I2C devices via the I2C/SM bus, minus the detected expander component and its blocked channel. The BMC maintains the channel block for the determined expander component until the BMC detects that the determined expander component has been removed in step 230.

In step 232, the BMC can recover the blocked channel used by the expander component once the BMC detected the removal of the expander component in step 230. In step 212, the BMC can reports that the expander component causing the bus hang has been removed and the channel that was blocked due to the bus hang caused by the expander component is now available for a new component to be connected to the expander.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of detecting a fault on a communication bus using a baseboard management controller, the method comprising:
   detecting, by the baseboard management controller, a bus hang of the communication bus;
   first resetting, in response to detecting a bus hang, all communication bus devices;

identifying, in response to the resetting failing to correct the bus hang, the communication bus device causing the bus hang;

blocking the identified communication bus device causing the bus hang;

second resetting, after the blocking, all the communication bus devices; and reconnecting a communication bus switch and the remaining ones of the communication bus devices via the communication bus.

2. The method of claim 1, further comprising:

determining, in response to the detecting, communication between the communication bus switch and the communication bus devices; and reporting, in response to the determining, the communication between the communication bus switch and the communication bus devices.

3. The method of claim 1, further comprising:

determining, in response to the identifying, the communication bus device causing the bus hang; and reporting, in response to the identifying, the communication bus device causing the bus hang.

4. The method of claim 1, further comprising:

identifying, in response to the second resetting failing to reset the bus hang, a communication bus component connected to a communication bus device causing a bus hang.

5. A method of detecting a fault on a communication bus using a baseboard management controller, the method comprising:

detecting a bus hang of a component connected to a channel of a communication bus device on the communication bus;

polling, in response to the detecting, of the component connected to the device on the communication bus;

identifying, in response to the polling failing to correct the bus hang, the component causing the bus hang;

blocking the channel used by the component causing the bus hang;

second resetting, after the blocking, all the communication bus devices; and reconnecting a communication bus switch and the remaining ones of the communication bus devices via the communication bus.

6. The method of claim 5, further comprising:

reporting, in response to the blocking, the component causing the blocking; and reporting, in response to the blocking, the channel using by the component causing the blocking.

7. The method of claim 6, further comprising:

removing, in response to the reporting, the component causing the blocking;

detecting, in response to the removing, the removal of the component causing the blocking; and recovering, in response to the detecting, the channel used by the component causing the bus hang.

8. The fault detector for a network system comprising:

a communication bus between a switch and a plurality of network devices; and a baseboard management controller (BMC) to monitor the communication bus;

a computer-readable medium storing instructions which, if executed, cause the switch comprising a baseboard management controller to perform operations comprising:

detecting, by the baseboard management controller, a bus hang of the communication bus;

first resetting, in response to detecting a bus hang, all communication bus devices;

identifying, in response to the resetting failing to correct the bus hang, the communication bus device causing the bus hang;

blocking the identified communication bus device causing the bus hang;

second resetting, after the blocking, all the communication bus devices; and reconnecting a communication bus switch and the remaining ones of the communication bus devices via the communication bus.

9. The fault detector of claim 8, the operations further comprising:

determining, in response to the detecting, communication between the communication bus switch and the communication bus devices; and reporting, in response to the determining, the communication between the communication bus switch and the communication bus devices.

10. The fault detector of claim 8, the operations further comprising:

determining, in response to the identifying, the communication bus device causing the bus hang; and reporting, in response to the identifying, the communication bus device causing the bus hang.

11. The fault detector of claim 8, the operations further comprising:

identifying, in response to the second resetting failing to reset the bus hang, a communication bus component connected to a communication bus device causing a bus hang.

12. The fault detector of claim 8, the operations further comprising:

detecting a bus hang of a component connected to a channel of a communication bus device on the communication bus;

polling, in response to the detecting, of the component connected to the device on the communication bus;

identifying, in response to the polling failing to correct the bus hang, the component causing the bus hang; and blocking the channel used by the component causing the bus hang.

13. The fault detector of claim 8, the operations further comprising:

reporting, in response to the blocking, the component causing the blocking; and reporting, in response to the blocking, the channel using by the component causing the blocking.

14. The fault detector of claim 8, the operations further comprising:

removing, in response to the reporting, the component causing the blocking;

detecting, in response to the removing, the removal of the component causing the blocking; and recovering, in response to the detecting, the channel used by the component causing the bus hang.

* * * * *